United States Patent [19]

Briffod

[11] Patent Number: 5,047,607
[45] Date of Patent: Sep. 10, 1991

[54] WIRE-CUTTING ELECTRIC DISCHARGE MACHINE WITH WIRE SECTIONING DEVICE FOR WIRE DISPOSAL

[75] Inventor: Jean-Paul Briffod, Lucinges, France

[73] Assignee: Charmilles Technologies S.A., Meyrin, Switzerland

[21] Appl. No.: 632,619

[22] Filed: Dec. 26, 1990

Related U.S. Application Data

[60] Continuation of Ser. No. 319,885, Mar. 2, 1989, abandoned, which is a division of Ser. No. 149,859, Jan. 29, 1988, abandoned.

[30] Foreign Application Priority Data

Jan. 30, 1987 [CH] Switzerland .......................... 339/87

[51] Int. Cl.⁵ ...................... B23H 7/02; B23D 25/12
[52] U.S. Cl. ................................. 219/69.12; 83/346
[58] Field of Search ............... 219/69.12; 140/139; 83/243, 331, 346, 347, 348, 659, 663, 674

[56] References Cited

U.S. PATENT DOCUMENTS

| 2,677,122 | 7/1972 | Rautine | 83/659 X |
|---|---|---|---|
| 3,008,366 | 11/1961 | Taylor, Jr. | 83/346 |
| 3,151,513 | 10/1964 | Rowlands | 83/346 |
| 3,483,780 | 12/1969 | Hudson | 83/346 |
| 3,751,364 | 6/1988 | Tobler et al. | 219/69.12 |
| 3,890,866 | 6/1975 | Verjux | 83/346 |
| 4,242,558 | 12/1980 | Kunze | 219/69.12 |
| 4,289,055 | 9/1981 | Von Schriltz | 83/659 |
| 4,608,897 | 9/1986 | Winkler | 83/348 X |
| 4,613,087 | 9/1986 | Snyder | 83/346 |
| 4,709,130 | 11/1987 | Lodetti et al. | 219/69.12 |

FOREIGN PATENT DOCUMENTS

| 56-89441 | 7/1981 | Japan . |
|---|---|---|
| 57-61422 | 4/1982 | Japan . |
| 1000696 | 8/1965 | United Kingdom . |
| 2010160 | 6/1979 | United Kingdom . |

Primary Examiner—Geoffrey S. Evans
Attorney, Agent, or Firm—Gifford, Groh, Sprinkle, Patmore and Anderson

[57] ABSTRACT

An EDM machine in combination with a wire sectioning device. The wire sectioning device has two rotating members consisting of a rotating member 2 having an anvil 16 and a member 3 rotating in the opposite direction. The rotating member 3 has four cutting blades made of a tough material such as tungsten carbide or tungsten nitrode. At least one of the anvil and the tool possesses a low moment of inertia to improve the longevity of the sectioning means.

24 Claims, 1 Drawing Sheet

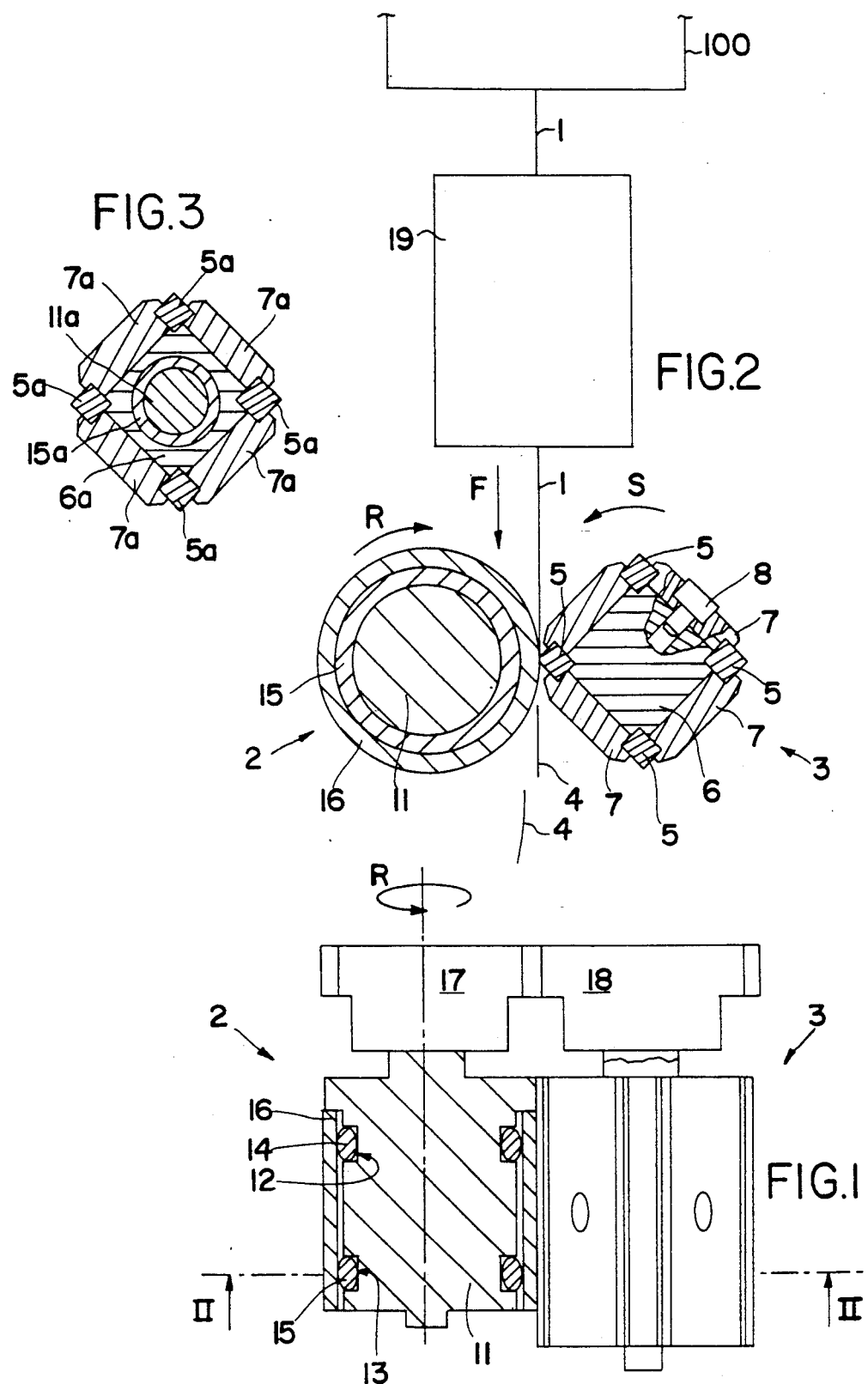

WIRE-CUTTING ELECTRIC DISCHARGE MACHINE WITH WIRE SECTIONING DEVICE FOR WIRE DISPOSAL

This is a continuation of Ser. No. 07/319,885, filed 03/02/89, now abandoned, which is a division of Ser. No. 07/149,859, filed 01/29/1988, now abandoned.

BACKGROUND OF THE INVENTION

The invention deals with a device for sectioning a metal wire. In particular, it is for cutting or chopping into sections or small pieces the electrode wire evacuated by a machine which cuts by electroerosion. The mechanical and electrostatic properties of the used wire electrode which is generally made of copper or by laying copper and/or copper brass on a core of steel, conduct to a wire which will possess a strong tendency for expansion in the receptacle or container in which it is stockpiled, which necessitates frequent intervention by the operator to compress the wire, because it forms not very dense entanglements which occupy rapidly the entire available space in the receptacle.

In effect, the wire is evacuated at a certain speed, between 7 and 14 m/min., and it conducts, if one wants to achieve automatic functioning the duration of an entire weekend, as an example, from an average stockpile of 37 km. of wire without human intervention. It is therefore necessary to compact it. But to this day, no satisfactory alternative to compacting without human intervention is known, and this prevents an autonomous functioning of EDM machines that cut with wire.

It is known to curl the electrode wire by making it pass between two toothed wheels, or also to cut it into small pieces which posses the capability of accumulating in a relatively dense pile. Devices of this type are described by patents U.S. Pat. No. 4,016,395, G.B. 2.010.160, DE b 35 11 930, JP 56-89441(A), JP 57-61422, JP 57-61423 which all relate to the field of electroerosion. In the two initial patents, the cutting tools are mounted on a rotating member which sections against anvil, which anvil does not rotate with a surface plane, concave and immobile with regard to the wire. Said anvil conducts therefore to a rapid wear of the cutting tools, in particular when the shopped electrode wire is difficult to section. An example would be a wire composed of copper and zinc. The worn cutting tools becoming inoperable and in the absence of an operator, the wires accumulate. By accumulating, wires hinder normal movement and provoke short circuits and general deterioration of the machining.

The further cited patents utilize rotating anvils, which are more advantageous. But the device described in patent DE 35 11 930 requires a floating bearing mounted in a very complicated structure with a spring and an oscillating arm for obtaining elasticity between tool and anvil. In the device described by patents, JP 56-89441, JP 57-61422 and JP 57-61423 said elasticity is obtained by a particular configuration of the cutting tools. But this complicates the forming of the tools and requires care in their alignment, with very strict tolerances, because the wire to be cut in small pieces has a diameter of only one-tenth of a millimeter. So then if one tool slightly shrinks with regard, to the other, it does not section the wire but to the contrary by projecting beyond its alignment the anvil or hammers the wire pieces into the anvil, if said anvil is not made of an extremely hard material. Elsewhere this is why a rotating brush is provided to clean the anvil which is encrusted with cut pieces of wire. Other devices, although they are not conceived for cutting small pieces of metal wire, which consist of a rotating blade and anvil are described in the following patents: U.S. Pat. No. 3,677,122 which concerns a process for continuously cutting (and not for discontinuously cutting as in the present invention), with ring-shaped blades, the cutting edges of which are parallel to the movement of a band in order to cut said band longitudinally with an anvil presenting radial elasticity. U.S. Pat. No. 3,828,637 and GB 1 000 696 relate to devices in which the rotating anvils do not present radial elasticity, but which describe rotating tools which could eventually be utilized in the present invention.

The object of the present invention is a device for sectioning a wire in a great number of pieces, which comprises two rotating members on parallel axes. These members rotate in opposite directions, the wire translating between them. The flange of one member acts as an anvil while the flange of the other member acts as a tool in which at least one cutting blade is mounted, such as to have its cutting edge positioned parallel to the axis of rotation of the members. In it's construction it is simple, yet sturdy and economical in its functioning. The design does not promote rapid wear and tear of the blades and permits elasticity in the pressure exerted by the anvil on the blades. The latter present a very simple configuration and setting up on the tool. This permits easy replacement of dulled blades, at any time, and facilitates rapid changes, without the need of a complicated adjustment. Said device is characterized by an anvil which is mounted around a radially elastic and rotating support surrounding the axis of rotation. In particular, this anvil can be constituted of a cylindrical sleeve which clasps at least one elastic ring surrounding a central core cylinder which is solidly attached to the rotating shaft. One thus obtains an elasticity in the pressure of the tool on the anvil even when the levels of the two rotating members remain motionless during the functioning of the chopping tool. Manifestly, this notably simplifies the construction when compared to available solutions. Moreover, since either the tool, or the anvil, or both, undergo brusque acceleration at the moment the two strike each other, it is advantageous for the question of longevity, that the elastically suspended part has a small inertia, which the invention favors since only the anvil is elastically suspended and not a whole rotating member as is the case with the known devices presenting an elastic suspension.

The above-mentioned application, in which the anvil is a sleeve resting on two elastic rings maintained in grooves, permits further the easy and unexpensive replacement of the anvil when it is used.

The invention is now illustrated by the description of one mode of execution and with the aid of the annexed drawings in which:

BRIEF DESCRIPTION OF THE DRAWINGS

FIG. 1 represents a simplified sectional view of the cutting device according to the invention, FIG. 2 represents a sectional view of the cutting device according to II—II in FIG. 1, FIG. 3 represents a sectional view of a portion of another preferred embodiment of the present invention, similar to FIG. 2, FIG. 4 represents a sectional view of a portion of another preferred embodiment of the present invention, and FIG. 5 represents a sectional view of a portion of another preferred embodiment of the present invention.

DETAILED DESCRIPTION OF THE PREFERRED EMBODIMENTS

In these two figures, the same pieces bear the same numbers for reference, and the figures are described simultaneously. Number 1 designates the used wire which is to be minced and, for clarity, it is sketched of only in FIG. 2. That wire, which will be generally evacuated from an electro-erosion machine, generally designated as 100 progresses in the direction of the arrow F and (passes between the rotating members 2 and 3 to be sectioned into small pieces 4, that fall into an appropriate receptacle (not represented). The rotating members 2 and 3 turn in opposite, directions as indicated by the arrows R and S. For clarity the axes of the members 2 and 3 are not shown, neither are the levels in which they are turned. As is particularly well illustrated in FIG. 2, the rotating member 3 allows for a central core 6 on which is mounted four cutting tools 5. They are maintained by four middle flanges 7, themselves being fixed on the core 6 with screw 8, of which only one is visible in FIG. 2. Any one of the tools 5 form a elongated prism presenting a square section, a longitudinal edge of which forms the active cutting edge. When one of the cutting edges becomes dulled, the corresponding tool can be easily demounted and afterwards remounted after having effected a quarter of a revolution around its longitudinal axis. This operation puts inexpensively into service a new cutting blade and the process can be repeated three times, as is the case of the square sectioned prisms in FIG. 2. These blades or prisms are easily commercially available. It is worth noting however, that there may be advantages to utilize in some cases other configurations with a symmetry of revolution, for example such as prisms on a triangular base or a polygon-style base, with a number of sides being more than only four sides. This last variation augments the number of cutting edges for one tool, and it is easy to realize in regards to this invention, since cutting edges having either an obtuse span (the cutting blade 5b shown in cross section in FIG. 4) or an acute one (the cutting blade 5c section in cross section in FIG. 5) are permitted by the present invention. This last embodiment, which can be very economical, is workable because the device of the invention is effective even if the cutting edge of the tool is round shaped. In the case that one so desires a large number of cutting edges with acute span, a prism with more than four ridges and with concave facets can be used. The blades are preferably made of tungsten carbide, or an equally tough material such as tungsten nitride or a ceramic. The cutting tools 5 can be coated with a wear-resistant film, for example, of tungsten nitride.

The rotating member 2 presents a hub 11, which is hollowed out in the form of two grooves 12, 13. Rings of rubber 14, 15 are placed in said respective grooves. Another cylinder 16 forms the anvil and engages forcibly on these rings 14, 15 which maintain it in an elastic manner. To that end, the inner diameter of the cylinder 16 is slightly larger than the outer diameter of the hub 11. It is easy to choose the materials with which to form the rings 14 and 15 and anvil 16, in order that the coefficient of friction between these pieces is sufficient for maintaining frictionally the anvil in place without having to use another fixation means. This permits economical exchange or replacement of the anvil, contrary to other systems, either in the case of a work anvil or when the change of one kind of wire to another requires to modify the thickness and/or the material of the anvil.

The speeds of rotation of members 2 and 3 are preferentially synchronized, in particular with the translation speed of the wire. It can also be advantageous to mount the support of the anvil in a manner that it turns freely and to synchronize only the speed of rotation of the member 3 with the linear speed of the wire. Among the numerous means which can be utilized for synchronizing the rotations R and S, a pair of toothed wheels 17 and 18 is shown in FIG. 1. with a reciprocal slope, of which each is slidably mounted to one of the two rotating members 2 and 3. In a preferred embodiment these toothed wheels have different numbers of teeth in order to turn with different angular speeds. In a very simple application of that embodiment the number of teeth in theses two wheels differ so that the tools 5 contact the anvil as infrequently as possible at the same place, so that maximum distribution of wear takes place. It can be therefore advantageous to replace the rotating members described here, by a friction gear, the inevitable creeping and wear of which avoids thus almost entirely a periodical repetition of the same relative position of the two rotating members, and the preferential wear at given locations of the anvil. The simultaneous rotation of the two members is directed by a known mechanism not represented here. In general the speed of this rotation is controlled in a known manner by the speed of the wire 1 upstream the sectioning device in order to ensure that the speed of translation of the wire pinched between one blade 5 and the anvil 2 is equal to the aforesaid upstream linear speed. Said speed is set up by a feeding mechanism 19 mounted immediately upstream members 2 and 3. In the case of a EDM cutting machine, said mechanism 19 brings about the smooth drawing of the wire across the machine from a feed reel or spool, surmounting thus high forces of friction; an example of fashioning such a mechanism is given in the U.S. Pat. No. 3,912,898. It is essential that the peripheral speed of the cutting edges of the tool, be close to the linear speed set by the mechanism 19. If this peripheral speed is lower than the aforesaid linear speed, that brings with it the risks of accumulation of wire upstream the cutting device. If said peripheral speed is higher than the aforesaid linear speed, the cutting edges drag the wire along, which brings about undesirable jerks upstream, which are particularly ill-fated in an electroerosion cutting machine. This is because the irregularity in the traction exercised on the wire causes vibrations and provokes linear defaults, such as striations appearing on the piece being machined. The device of the invention permits the cutting into sections of used electrode wire, with the stockpile forming adequately compacted in its receptacle. This occurs without disturbing the functioning of the EDM machine.

Although in the application described here, only the anvil 2 is maintained in an elastic manner with regard to the axis around which it turns, whereas the cutting blades 5 rest at a fixed distance from the axis of rotation of the tool, one can immediately see that it is possible to mount the cutting blades elastically in regards to the axis of rotation of the tool. That mounting can be effected analogously to this described here for the anvil 2, that is to say by threading a sleeve bearing the cutting blades on several elastic rings. Such a construction is shown in cross section in FIG. 3, the elements therein corresponding to similarly numbered elements shown in and described in conjunction with FIGS. 1 and 2. It is also possible to provide means 102 (shown only schematically in FIG. 2) for varying the distance between the shafts of rotation of the anvil-support and of the tool-support. This permits particularly the regulation of the blades onto the anvil, and to adapt, for example, to various diameters or various hardnesses of the wire to be sectioned.

We claim:

1. A combination for providing numerous cut sections of an EDM machining wire, comprising:
 an EDM machine apparatus;
 an electrode wire evacuated by said EDM machining apparatus at a linear speed; and
 means for sectioning said evacuated wire into numerous cut sections, comprising:
 rotating hub having an axis of rotation;
 a rotating core having an axis of rotation parallel to the axis of rotation of said hub;
 an anvil disposed about and rotating with said hub;
 a tool disposed about and rotating with said core;
 at least one blade borne on said tool having a cutting edge disposed parallel to the axes of rotation of said hub and said core; and
 means for radially elastically mounting at least one of said anvil and said tool to a respective one of said hub and said core comprising a radially elastic support rotting with said respective one of said hub and said core, surrounding said axis of rotation of said respective one of said hub and said core;
 wherein said wire is located so as to translate between said anvil and said tool; and
 wherein said at least one of said anvil and said tool possesses a low moment of inertia, thereby both lessening the effect of acceleration experienced during impact of said blade against said anvil and improving the longevity of said sectioning means.

2. The invention of claim 1, wherein said anvil and said tool rotate at different angular speeds from one another.

3. The invention of claim 1, wherein said radially elastically mounting means comprises at least one circumferential groove on said respective one of said hub and said core, and said radially elastic support comprises an elastic ring in each of said grooves abutting said at least one of said anvil and said tool.

4. The invention of claim 3, wherein said at least one groove, said elastic ring in each of said grooves, and said at least one of said anvil and said tool are dimensioned in such a manner that said at least one of said anvil and said tool is maintained in place on said respective one of said hub and said core only by friction.

5. The invention of claim 1, further comprising an engaged pair of toothed wheels connected one each to said hub and said core for synchronizing rotation of said hub and said core.

6. The invention of claim 5, wherein said toothed wheels have different numbers of intermeshing teeth in order to distribute points of contact between said tool and anvil and thereby maximize area of wear distribution.

7. The invention of claim 1, wherein said hub is cylindrical, said mounting means comprises at least one elastic ring disposed about said core, and said anvil comprises a cylindrical sleeve surrounding said elastic ring.

8. The new invention of claim 1, wherein said core is cylindrical, said mounting means comprises at least one elastic ring disposed about said core, and said tool comprises a blade holder.

9. The invention of claim 1, wherein said at least one blade is mounted on said core in such a manner as to be radially elastic.

10. The invention of claim 1, further comprising means for rotating said tool at a peripheral speed differing from said linear speed of said evacuated wire by less than a predetermined value.

11. The invention of claim 9, wherein said predetermined value is no more than 10% of said linear speed of said evacuated wire.

12. The invention of claim 1, further comprising means for rotating said tool at a peripheral speed equal to said linear speed of said evacuated wire.

13. The invention of claim 1, further comprising means for synchronously driving said hub and said core.

14. The invention of claim 1, wherein said at least on blade is configured as a prism having a generally polygonally-shaped base but whose apical angles are greater than 90 degrees.

15. The invention of claim 14 wherein said at least one blade possesses four lateral edges.

16. The invention of claim 1, wherein said at least one lade comprises a plurality of concave facets.

17. The invention of claim 1, wherein said at least one blade is composed of tungsten carbide.

18. The invention of claim 1, wherein said at least one blade is composed of a ceramic.

19. The invention of claim 1, wherein said at least one blade includes at least an outer film composed of tungsten nitride.

20. The invention of claim 1, wherein said at least one of said anvil and said tool is configured as a hollow sleeve, disposed about said respective one of said hub and said core.

21. The invention of claim 1, wherein said anvil member freely rotates during operation.

22. The invention of claim 1, further comprising means for driving at least said core synchronously with said linear speed of said wire.

23. The invention of claim 1, further comprising means for driving said hub and said core synchronously with said linear speed of said wire.

24. The invention of claim 1, further comprising means for varying the distance between said hub and said core.

* * * * *